United States Patent [19]

Wocher et al.

[11] 4,203,112
[45] May 13, 1980

[54] METHOD AND SYSTEM FOR INCREASING THE DISTANCE WHICH CAN BE UNAMBIGUOUSLY MEASURED BY A RADAR SYSTEM

[75] Inventors: Berthold Wocher, Leonberg; Thomas Pfendler, Gerlingen, both of Fed. Rep. of Germany

[73] Assignee: Robert Bosch GmbH, Stuttgart, Fed. Rep. of Germany

[21] Appl. No.: 908,980

[22] Filed: May 24, 1978

[30] Foreign Application Priority Data

May 24, 1977 [DE] Fed. Rep. of Germany ....... 2723355

[51] Int. Cl.$^2$ .......................... G01S 7/28; G01S 9/12
[52] U.S. Cl. .............................. 343/13 R; 343/171 R
[58] Field of Search ........................ 343/13 R, 17.1 R

[56] References Cited

U.S. PATENT DOCUMENTS

| | | | |
|---|---|---|---|
| 3,117,317 | 1/1964 | Kenyon | 343/13 R |
| 4,132,991 | 1/1979 | Wocher et al. | 343/13 R |

*Primary Examiner*—Malcolm F. Hubler
*Attorney, Agent, or Firm*—Frishauf, Holtz, Goodman & Woodward

[57] ABSTRACT

A radar system utilizes stretched radar pulses generated by multiplying the received radar pulse sequence by an auxiliary pulse sequence having a slightly lower pulse repetition frequency than the transmitted radar pulses. The pulse repetition period of the sequence of auxiliary pulses therefore exceeds the pulse repetition period of the transmitted radar pulses by a predetermined time difference. To eliminate echoes from undesired targets located more than a predetermined maximum distance from the radar the sequence of auxiliary pulses is synchronized to the sequence of transmitted radar pulses periodically with a synchronizing time including a predetermined number of transmitted radar pulses. The predetermined number is so chosen that the product of the number minus one, multiplied by the predetermined time difference, is equal to the time required for a radar pulse to travel back and forth from a target located at the predetermined maximum distance.

10 Claims, 2 Drawing Figures

METHOD AND SYSTEM FOR INCREASING THE DISTANCE WHICH CAN BE UNAMBIGUOUSLY MEASURED BY A RADAR SYSTEM

The present invention relates to a method and system for measuring the distance to a target by transmitting a sequence of radar pulses at a transmitted radar pulse repetition rate towards the target and receiving echoes from the target and more particularly to radar for use in a vehicular obstacle, or collision avoidance system.

U.S. Pat. No. 4,132,991, WOCHER et al, assigned to the assignee of this application (to which German Disclosure Document DE-OS 25 44 842 corresponds) discloses a method and system for generating and utilizing stretched radar pulse sequences (i.e. stretched with respect to time). Corresponding to U.S. Ser. No. 729,663, now U.S. Pat. No. 4,132,991. The stretching of the radar pulses disclosed in this publication results in a great simplification of the circuits required to generate the actual measurement signal. This causes a great decrease in the overall cost of a pulse radar system, particularly a traffic radar. The savings results in spite of the fact that additional equipment is needed for generating the stretched radar pulses. The decrease in cost results from the fact that the circuits for furnishing the measurement signal can be low frequency circuits, rather than the high frequency circuits previously used.

In the known method and system for measuring the distance between the transmitter of a pulsed radar system and a given object or target which furnishes an echo, takes place indirectly by measurement of the time $T_a$ which is required for a short continuous wave pulse to travel at the speed of light from the transmitting antenna to the target and back to the receiving antenna.

Under the above assumptions, the equation for the distance a of the target from the radar system is given by relationship (1) in the attached Table of Relationships. Derived from relationship (1), $T_a$ is given by relationship (2).

If it is desired to measure short distances with high resolution as is the case, for example, in traffic radar systems or vehicle-range radar systems, the transit time, which is to be measured with high resolution, is very short. For example, for a maximum target distance $a_{max}$ of 150 meters and a required resolution $\Delta a$ of 0.15 m a maximum transit time $T_{max}$ of 1 microsecond results, which is to be measured with a resolution $\Delta T_a$ of a nanosecond. This high resolution with respect to time can be achieved with the known time stretching method and system.

A further problem arises for range measurements by pulsed radar systems, independent of whether these radar systems work with or without time stretching. If it is desired to measure the distance between the transmitter and target to a predetermined accuracy while there is relative motion between the transmitter and target, echoes will be received from unselected targets which result from radar pulses transmitted one or more periods previously. Thus, echoes may be processed which are beyond the region in which target distances are to be determined. For such undesired targets the range measurement is ambiguous, since measurement of the transit time restarts with each transmitted radar pulse. As a result, it is not the actual transit time $T_a$ to the target which is being measured, but a transit time $T_a'$ in accordance with relationship (3). The distance a' corresponding to $T_a'$ is given by a relationship (4), wherein $T_s$ is the pulse repetition time of the transmitted radar pulses and $a_s$ is the so-called unambiguous distance. The range measurement is ambiguous since in relationships (3) and (4) the value of $z = 1, 2, 3 \ldots$ is unknown. For a radar with a transmitted radar pulse repetition frequency $f_S = 1$ MHz, the unambiguous distance $a_S = 150$ m, so that a target at a distance $a = 180$ m will, according to the above relationships, be indicated incorrectly as a target at a distance $a' = 180$ m $- 150$ m $= 30$ m. In principle the possibility exists, that for achieving an unambiguous measurement result, the pulse repetition period $T_s$ and thereby the unambiguous distance $a_s$ be enlarged to such an extent that echoes at a distance greater than $a_s$ are so weak that they are suppressed. For example, a transmitting repetition frequency $f_S$ of 10 kHz could be used, thereby obtaining an unambiguous distance $a_s$ of 15 km. Under these conditions an undesired echo received from this distance from equally reflective targets will be by a factor of $10^{-8}$ weaker than the echo received from a distance of 150 m. However, the use of such a strongly reduced transmitting repetition frequency is impossible without considerable drawbacks if advantage is to be taken of the known time stretching method. This will be described in greater detail below.

In the known time stretching method for a radar pulse sequence, as previously mentioned, the stretching effect is achieved by multiplication or scanning of the periodic or rather quasi-periodic received radar pulse sequence VS having a pulse repetition period $T_s$ by an auxiliary pulse sequence Hs having a slightly lower pulse repetition frequency. The time at which the individual pulses of the auxiliary pulse sequence Hs scan the received radar pulse sequence is delayed relative to the transmitting time from transmitting period to transmitting period by a delay time interval $\Delta T_a$ (herein also referred to as the predetermined time difference between the pulse repetition time of the sequence of auxiliary pulses and that of the sequence of transmitted radar pulses). $\Delta T_a$ is given by a relationship (5), wherein $T_H$ is the pulse repetition time of, or period of, the sequence of auxiliary pulses and $f_H$ the pulse repetition rate thereof.

After each $n_c$ periods of the transmitted radar frequency $f_S$, the scanning time instant has been delayed by a time $T_A$ max $= T_s$, that is by the full pulse repetition time of the transmitted radar sequence. The number $n_c$ is given by relationship (6). The pusle repetition time of a scanning cycle is thus given by relationship (7); the resulting time stretch factor $k_D$ is given by relationship (8).

To allow the radar pulse sequence to be scanned as often as possible during a scanning cycle, the delay time interval $\Delta T_a$ should be small relative to the pulse width $T_1$ of the radar pulses. Since an upper limit for the delay time interval $\Delta T_a$ cannot be exceeded, and since the lower limiting values for the period $T_c$ of the scanning cycle and therefore of the time stretch factor $k_d$ depend upon the transmitted radar pulse repetition frequency $f_s$, both $T_c$ and $k_D$ depend to a great extent only upon the transmitted radar pulse repetition rate. A short numerical example will be used to explain the consequences of this mutual dependency. Let it be assumed that: $f_s = 1,000$ kHz and $f_H = 999$ kHz. For these values $\Delta T_a = 1.001$ nanoseconds, $k_D = 1,000$, $T_c = a$ millisecond, and $a_s = 150$ m. Further, assume that the pulse width $T_1$ of the radar pulses is 20 ns. For a reduced radar transmitting pulse repetition rate $f_s = 10$ kHz ($T_s = 10^{-4}$s) and substantially the same delay time interval $\Delta T_a = 1$ nanosecond, the following values are obtained: $f_H = 9.9999$ kHz, $k_D = 100,000$; $T_c = 10$ s. However, a scanning period of 10 seconds per cycle would means that each location is scanned only once every 10 seconds. However, on the other hand, echo signals from targets for distances up to 15 km can be recognized and evaluated (echo transit time $10^{31.4}$s). However, for short range radar systems as, for example, required for motor vehicles, only distances to a range of approximately 150 m are of interest. However the distance to the target, or the range, should be measured each 0.1 seconds so that changes in the distance to the target can be recognized quickly when there is relative motion to the target. A radar system operating at a frequency of 10 kHz would thus be too slow in operation and would extend to much too great a range.

THE INVENTION

It is an object of the present invention to furnish a method and system for generating an unambiguous measurement signal signifying the distance to the target in a short range radat. More specifically, the advantages of the known time stretching method and apparatus are to be utilized.

Briefly, in accordance with the present invention, the sequence of auxiliary pulses is synchronized periodically to the transmitted radar pulses sequence. The synchronization takes place every N plus one periods of the transmitted radar pulse sequence, the value for N being such that the maximum delay time $N\Delta T_a$ corresponds to the transit time for a pulse to travel to and from a target positioned at the maximum distance for which a measurement is desired. Specifically, the value N is chosen according to relationship (9) where n = 0, 1, 2, ... N. In a preferred embodiment N is so-chosen that the maximum delay time corresponds approximately to a maximum target distance of 150 m or a transit time of 1 microsecond. Thereafter, the auxiliary pulse sequence is synchronized to the transmitted radar pulse sequence, that is the delay time is reset to zero and a new scanning cycle starts, that is n = 0. For n = 1,023 and $\Delta T_a = 1$ nanosecond, $T_a$ max = 1,023 microseconds. The greatest distance for which a range measurement signal can then be derived is a $_{max} = 153.45$ m. For a radar pulse repetition frequency $f_s = 10.24$ kHz, the period $T_c$ of a scanning cycle is given by equation (10). A time stretch factor given by relationship (11) results. An unambiguous distance $a_S$ of 14.65 km relative to the 150 m in the known systems results. Thus, in spite of the low transmitted radar repetition frequency of, for example, 10 kHz and a corresponding increase in the unambiguous distance $a_S$, it is still possible to obtain the desired small duration of the delay time interval $\Delta T_a$, the required repetition rate for the measurement and the desired time stretch factor $k_D$. At the same time the possibility that the radar pulse transmitted from another radar apparatus, which may for example be mounted in a vehicle travelling in the opposite direction, is mistaken for an echo pulse is substantially decreased.

A preferred embodiment of the system of the present invention comprises a counter which counts the transmitted radar pulses and which is reset when a count of N is reached. At the same time, a synchronization signal is generated. Use of such a counter allows the periodic synchronization of the auxiliary pulse sequence to the transmitted radar pulse sequence to be carried out in a particularly simple fashion.

In a preferred embodiment, a saw-tooth generator synchronized by the transmitted radar pulses is provided. The output of the saw tooth-generator is compared to the output of a digital-analogue converter which is connected to the above-mentioned counter. An auxiliary pulse is furnished whenever the output of the saw-tooth generator becomes equal to that of the digital-analogue converter. A multiplier circuit then receives the auxiliary pulse sequence at a first input and the received radar pulses at a second input.

DRAWING ILLUSTRATING A PREFERRED EMBODIMENT

Figure 1:
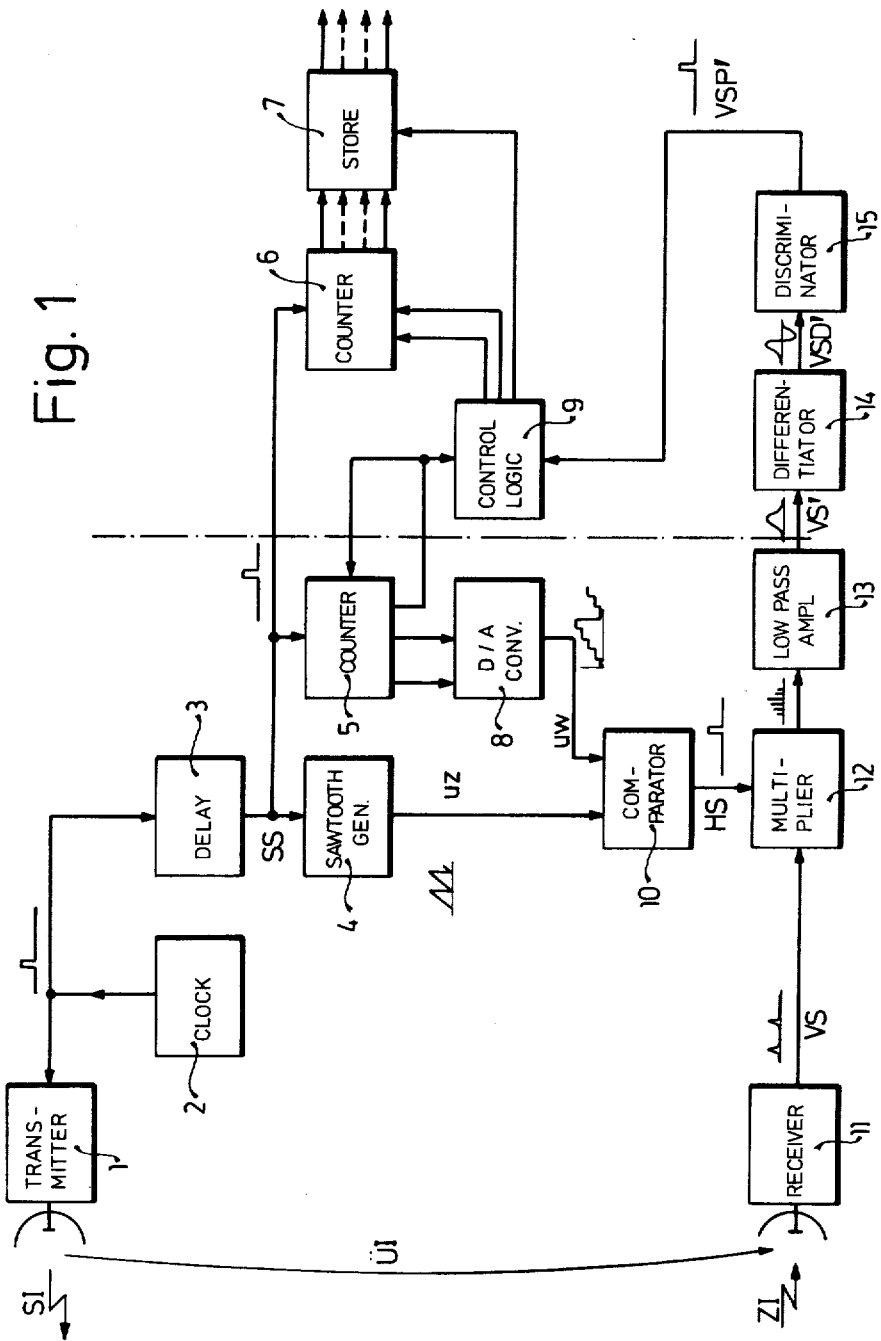
FIG. 1 is a block diagram of the radar system of the present invention.

The radar system shown in FIG. 1 comprises the following elements;

a transmitter 1, a clock generator 2, a delay circuit 3, a saw-tooth generator 4, a first counter 5, a second counter 6, a storage 7, a digital-analogue converter 8, a control circuit 9, a comparator 10, a receiver 11, a multiplier 12, a low pass amplifier 13, a differentiating circuit 14 and a discriminator 15.

OPERATION

Clock generator 2 generates clock pulses at a pulse repetition frequency which determines the pulse repetition frequency of the transmitted radar pulses. In a preferred embodiment this frequency $f_S = 10.24$ kHz. The clock pulses synchronize transmitter 1 which oscillates at a substantially higher frequency, eg 35 GHz and generates a continuous wave pulse of a pulse width of, for example, $T_1 = 20$ nanoseconds in response to each clock pulse. A small portion of the radiated energy of each radar pulse reaches receiver 11, which is located close to transmitter 1, as a cross-talk pulse. The remaining energy is radiated in space in front of transmitter 1. If a reflecting target is located within the space covered by the radar pulse, a portion of the radiated energy returns as echo Z1 to receiver 11. Relative to the cross-talk pulse U1, echo pulse Z1 is received with a delay time $T_a$ at receiver 11. A received sequence of radar pulses synchronized to the transmitted radar pulse sequence including the cross-talk pulse U1 and one or more echo pulses Z1 will appear at the output of receiver 11. This received sequence of radar pulses will be substantially periodic if the assumption is made that the transmitted radar repetition frequency is high relative to the speed at which the distance between the transmitter and the target changes. In the following, it will be assumed for the sake of simplicity that only one target is present in the area covered by the radar pulses. The received sequence of radar pulses, denoted by VS in the figure, is applied to one input of multiplier 12.

The clock pulses at the output of clock pulse generator 2 are also applied to a delay circuit 3, which is basically unrelated to the present invention but is required in practice to compensate for the different delay times generated in transmitter 1 and receiver 11. The suitably delayed clock signals SS at the output of delay circuit 3 are applied to the input of saw-tooth generator 4 and are further applied to the counting inputs c of the first and second counter 5, 6.

Saw-tooth generator 4 generates a voltage $u_Z$ in response to each clock pulse SS. The voltage $u_Z$ starts at zero and rises linearly to a maximum voltage $u_{max}$ and then returns substantially instantaneously to zero. The voltage $u_Z$ at output of saw tooth generator 4 is applied to one input of comparator 10. The second input of comparator 10 is connected to the output of digital-analogue converter 8. The inputs of digital-analogue converter 8 are connected to the outputs of counter 5, which carry the counting output signal in binary coded form. The output of digital-analogue converter 8 is zero for a counting output of n=0, and rises with each clock pulse SS in step-wise fashion to a maximum value $n_{max}$ of, for example, 1,023. The next clock pulse SS then resets counter 5 to zero thereby starting a new cycle for the output signal of digital-analogue converter 8.

Comparator 10 furnishes a pulse-shaped output signal when the voltage $u_z$ crosses the output voltage $u_w$ of digital-analogue converter 8. The pulse-shaped output signals of comparator 10 are utilized, in accordance with the invention, as the sequence of auxiliary pulses HS, which are applied to the second input of multiplier 12.

Figure 2:
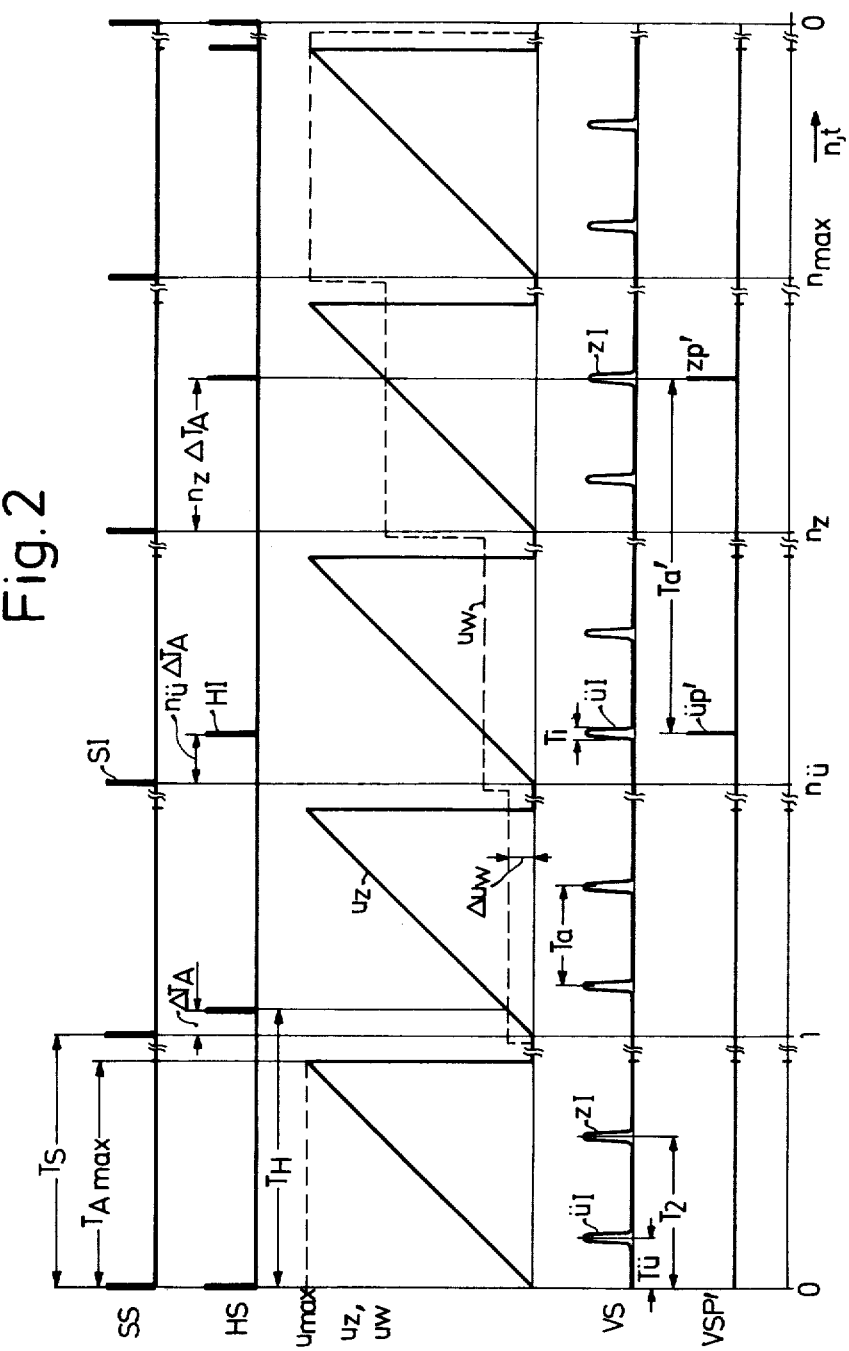
FIG. 2 shows signal variation with respect to time at selected points in the system of FIG. 1.

The sequence of delayed clock pulses SS, the sequence of auxiliary pulses HS, the voltages $u_Z$ and $u_W$ as well as pulse sequences VS and VS' are shown in FIG. 2 for five different periods of the transmitted radar pulse repetition frequency fs to clarify the explanation of the basic principle of the method of the present invention. Reference to FIG. 2 shows that, because of the step-wise change $\Delta u_w$ at the output of digital-analogue converter 8 for each count in counter 5, each pulse of the auxiliary pulse sequence $H_s$ at the output of comparator 10 is delayed by a further delay interval $\Delta T_a$, so that a total delay of $n.T_a$ results after clock pulse n.

The system is returned to its starting condition as soon as the output voltage of digital-analogue converter 8 reaches the maximum value $u_{max}$ of the output voltage of saw tooth generator 4. The output voltage of digital-analogue converter 8 thus starts at zero and, for the duration of $n_{max}$ periods of the transmitted radar frequency rises, for each count on counter 5, by the amount given in relationship (12a), thereby causes corresponding shifts in the scanning time instants, each by the relationship given in equation (12b).

As also shown in FIG. 2, the continuous shifting of the scanning time instant causes an auxiliary pulse $H_1$ of the auxiliary pulse sequence HS to coincide with the maximum of the cross-talk pulse $U_1$ after a number of steps $n_u$. At a later count $n_Z$ one of the auxiliary pulses coincides with the maximum of the echo pulse Z1. During the counts immediately preceding and following counts $n_u$ and $n_c$, a partial coincidence between signals Hs and Vs occurs. The corresponding pulses at the output of multiplier 12 are integrated by means of low pass amplifier 13 to time stretched pulses Vs'. The sequence of pulses Vs' is then differentiated by differentiator 14. The output of differentiator 14, VSD', is applied to discriminator 15 which operates as an amplitude discriminator and zero passage detector. The output of discriminator 15 is a well shaped pulse sequence VSP' which comprises pulses UP' and ZP' corresponding, respectively, to cross-talk pulse U1 and echo pulse Z1. Signal generating and shaping in accordance with the present invention is completed at the output of low pass amplifier 13. The differentiator 14 and discriminator 15 are already part of the circuits utilized to evaluate the so-generated and shaped signals. In FIG. 1, a dash-dot line separates the signal generating and shaping circuits from the evaluating circuits.

To generate the actual distance signal, the pulse UP' at the output of discriminator 15 is first applied to the the control logic circuits 9. In response to this pulse, control circuit 9 furnishes a first control signal which resets counter 6 to zero. Counter 6 then counts the subsequent clock pulses SS until it is blocked by pulse ZP'. At this time, the count on counter 6 is given by equation (13).

The count given by equation (13) is transferred to storage 7 at the end of the scanning cycle. The singal is stored in storage 7 as a binary coded number which constitutes the measurement signal since it is indicative of the distance a to the target. Specifically, if $\Delta T_a$ is one nanosecond, equations (1) and (13) may be combined to yield equation (14) i.e. the expression for the target distance.

The above explanation shows clearly that the present invention can be implemented with simple and low cost equipment. All building blocks in the evaluating circuitry as well as low pass amplifier 13 operate at relative low frequencies, that is, for example, an upper limiting frequency of approximately 500 Hz. Such a low frequency results not only in relatively inexpensive units, but also in circuits which are relatively immune to noise. The low frequency is achieved by the fact that the delayed radar pulse sequence VS' is stretched by a factor $k_D$ of approximately 100,000 for the above-assumed values. This means that in addition to increased pulse width the rise and fall time of the pulses is also correspondingly increased.

It is a substantial advantage of the system and method according to the present invention that externally generated noise pulses from other radar equipment can only affect the result when they coincide in time with the very short auxiliary pulse and, due to low pass amplifier 14, even then only if this occurs several times in sequential period of the transmitted radar pulse sequence.

Various changes and modifications may be made within the scope of the inventive concept.

TABLE OF RELATIONSHIPS $$a = 1.5 \cdot 10^8 \text{ m/s} \cdot T_a \tag{1}$$
$$T_a = 6.6 \cdot 10^{-9} \text{ s/m} \cdot a \tag{2}$$
$$T_a' = T_a - z T_S \tag{3}$$
$$a' = a - z a_S \tag{4}$$
$$\Delta T_A = T_H - T_S = 1/f_H - 1/f_S \tag{5}$$
$$n_c = \frac{T_H}{\Delta T_A} = \frac{f_S}{f_S - f_H} = 1 + \frac{1}{f_S \cdot \Delta T_A} \tag{6}$$
$$T_c = n_c T_S = \tag{7}$$
$$\frac{T_H \cdot T_S}{\Delta T_A} = \frac{1}{f_S - f_H} = \frac{1}{f_S}(1 + \frac{1}{f_S \cdot \Delta T_A})$$
$$k_D = n_c = \frac{f_S}{f_S - f_H} = 1 + \frac{1}{f_S \cdot \Delta T_A} \tag{8}$$
$$T_{A\,max} = N \cdot \Delta T_A \tag{9}$$
$$T_c = \frac{1 + n_{max}}{f_S} = \frac{1024}{10240} = 0.1 \text{ s} \tag{10}$$
$$k_D = 1 + \frac{1}{f_S \cdot \Delta T_A} = 97\,657.25 \approx 10^5 \tag{11}$$
$$\Delta u_w = \frac{u_{max}}{n_{max}} \tag{12a}$$
$$\Delta T_A = \frac{T_{A\,max}}{n_{max}} \tag{12b}$$
$$n_a = n_z - n_u \tag{13}$$
$$a = 0.15 \text{ m} \times n_a. \tag{14}$$

We claim:

1. Method for furnishing a distance signal signifying the distance from a radar apparatus location to a target located at less than a predetermined maximum distance from the radar apparatus, in response to a substantially periodic reflected received sequence of radar pulses having a pulse repetition frequency corresponding to the radar pulse repetition frequency of a transmitted radar pulse sequence, comprising, in accordance with the invention, the steps of
creating a sequence of auxiliary pulses having an auxiliary pulse repetition frequency slightly less than said radar pulse repetition frequency and periodically synchronized to said transmitted radar pulse sequence at time periods corresponding to the time required for a radar pulse to travel twice said predetermined maximum distance;
multiplying said received sequence of radar pulses by said sequence of auxiliary pulses thereby creating a multiplier output signal;
creating a sequence of stretched pulses in response to said multiplier output signal;
and furnishing said distance signal under control of said sequence of stretched pulses.

2. A radar system as set forth in claim 1, wherein the pulse repetition time of said sequence of auxiliary pulses exceeds the pulse repetition time of said sequence of transmitted radar pulses by a predetermined time difference;
and wherein said sequence of auxiliary pulses is synchronized to said sequence of transmitted radar pulses after a predetermined number of said transmitted pulses such that the product of said predetermined number minus one multiplied by said predetermined time difference is substantially equal to the time required for a radar pulse to travel twice said predetermined maximum distance.

3. In an obstacle avoidance radar system furnishing a measurement signal indicative of the distance from said system to a target located at less than a predetermined maximum distance therefrom, said radar system having
transmitting means (1) for transmitting a sequence of transmitted radar pulses at a radar pulse repetition frequency,
receiving means (11) for receiving a sequence of substantially periodic radar pulses and furnishing a sequence of received radar pulses corresponding thereto,
and measurement signal furnishing means (6, 7, 9, 12–14) responsive to said sequence of received radar pulses and to a sequence of auxiliary pulses, for creating said measurement signal:
auxiliary means (4, 5, 8, 10) for furnishing a pulse sequence having a pulse repetition frequency differing slightly from said radar pulse repetition frequency;
and connecting means for connecting said auxiliary means to said measurement signal furnishing means in such a manner to generate a measurement pulse sequence forming said measurement signal;
said auxiliary means being connected to and synchronized to said transmitted radar pulses at time periods corresponding to the time required for a radar pulse to travel twice said predetermined maximum distance.

4. A radar system as set forth in claim 3, wherein said auxiliary pulse repetition frequency is slightly less than said radar pulse repetition frequency.

5. A radar system as set forth in claim 4, wherein the pulse repetition time of said sequence of auxiliary pulse exceeds the pulse repetition time of said sequence of transmitted radar pulses by a predetermined time difference;
and wherein said sequence of auxiliary pulses is synchronized to said sequence of transmitted radar pulses after a predetermined number of pulses of said sequence of transmitted radar pulses, such that the product of said predetermined number minus one multiplied by said predetermined time difference is substantially equal to the time required for a radar pulse to travel twice said predetermined maximum distance.

6. A radar system as set forth in claim 5, wherein said auxiliary means comprises first counting means (5) connected to said transmitting means for counting the number of transmitted radar pulses, furnishing an overflow signal when the so-counted number of pulses is equal to said predetermined number, and resetting in response to said overflow signal.

7. A radar system as set forth in claim 6, further comprising digital-analogue converter means (8) connected to said first counting means, for furnishing an analogue output signal corresponding to the count on said first counting means, saw tooth generator means (4) connected to said transmitting means for furnishing a saw tooth signal in response to each of said transmitted radar pulses, and comparator means (10) connected to said saw-tooth generator means and said digital-analogue converter means, for furnishing a comparator output signal when the amplitude of said saw tooth signal exceeds the amplitude of said analogue signal, thereby furnishing a sequence of comparator output signals, said sequence of comparator signals constituting said sequence of auxiliary pulses.

8. A radar system as set forth in claim 7, wherein said measurement signal furnishing means comprises multiplier means (12) having a first input connected to said receiving means and a second input connected to said comparator means for furnishing a multiplier output signal corresponding to the product of the signals at said first and second inputs, low frequency amplifier means (14) connected to said multiplier means for furnishing amplified low frequency signal corresponding to said multiplier output signal, differentiator means (14) connected to said low pass amplifier means for differentiating said amplified low frequency signal and furnishing a differentiated signal in response thereto, discriminator means (15) connected to said differentiator means for furnishing a discriminator output pulse whenever said differentiator output signal has a predetermined amplitude, thereby creating a sequence of discriminator output signals, and logic circuit means (9) connected to said discriminator means and said first counting means, for furnishing a first control signal in response to a first predetermined one of said discriminator output signals, a second control signal in response to a second predetermined one of said discriminator output signals, and a third control signal in response to said overflow signal.

9. A radar system as set forth in claim 8, wherein said sequence of received radar pulses comprises a cross-talk pulse received directly from said transmitting means, followed by an echo pulse received from said target;
and wherein said first predetermined one of said discriminator output signals is a discriminator output pulse corresponding to said cross-talk pulse, and said second predetermined one of said discriminator output signals is a discriminator output pulse corresponding to said echo pulse.

10. A radar system as set forth in claim 9, further comprising clock pulse generator means (2) connected to said transmitting means, for furnishing a sequence of clock pulses, each timing the transmission of one of said radar pulses;

and wherein said measurement signal furnishing means further comprises second counting means (6) having a counting input connected to receive said clock pulses, a reset-to-zero-and-enable input connected to receive said first control signal, and a blocking input connected to receive said second control signal, for counting said clock pulses upon receipt of said first control signal and until receipt of said second control signal, and furnishing a second counting output signal corresponding to the number of so-counted pulses, and storage means (7) for receiving said second counting output signal in response to said third control signal and furnishing said measurement signal in correspondence to the so-received second counting output signal.

* * * * *